United States Patent
Chang (10) Patent No.: US 6,658,977 B2
(45) Date of Patent: Dec. 9, 2003

(54) LOCKING MECHANISM FOR INCLINATION ADJUSTMENT OF A BLADE OF A CUTTING DEVICE

(76) Inventor: Lee-Cheng Chang, 9F-2, No. 31, Lane 238, Si Ping Road, Taichung (TW)

(*) Notice: Subject to any disclaimer, the term of this patent is extended or adjusted under 35 U.S.C. 154(b) by 233 days.

(21) Appl. No.: 09/921,339

(22) Filed: Aug. 2, 2001

(65) Prior Publication Data

US 2003/0024365 A1 Feb. 6, 2003

(51) Int. Cl.⁷ .................................................. B27B 5/20
(52) U.S. Cl. ......................... 83/490; 83/471.3; 83/473; 83/581
(58) Field of Search ........................ 83/471.3, 490, 83/473, 581

(56) References Cited

U.S. PATENT DOCUMENTS

| | | | | |
|---|---|---|---|---|
| 3,974,565 A | * | 8/1976 | Ellis ............................ 30/115 |
| 4,587,875 A | * | 5/1986 | Deley ........................ 83/471.3 |
| 5,020,406 A | * | 6/1991 | Sasaki et al. ................ 83/397 |
| 5,370,025 A | * | 12/1994 | Itzov ............................ 83/397 |
| 5,865,079 A | * | 2/1999 | Itzov ........................ 83/468.2 |
| 5,988,031 A | * | 11/1999 | Wixey ....................... 83/471.3 |
| 6,067,885 A | * | 5/2000 | Brunson et al. ........... 83/471.3 |
| 6,073,529 A | * | 6/2000 | Shibata et al. ............. 83/468.5 |
| 6,289,778 B1 | * | 9/2001 | Wixey ....................... 83/471.3 |
| 6,532,853 B1 | * | 3/2003 | Kakimoto et al. ........ 83/698.11 |

* cited by examiner

Primary Examiner—Paul T. Sewell
Assistant Examiner—Nini F. Legesse
(74) Attorney, Agent, or Firm—Alan D. Kamrath; Rider Bennett, LLP (57) ABSTRACT

A cutting device includes a base, a swivel seat rotatably mounted on the base and having a first end and a second end, and a blade holder releasably engaged with the second end of the swivel seat. A blade is rotatably held by the blade holder. The blade holder is pivotable relative to the swivel seat for cutting when the blade holder is engaged with the second end of the swivel seat. An inclination of the blade relative to the swivel seat is adjustable when the blade holder is disengaged from the second end of the swivel seat. An operative rod is mounted to the first end of the swivel seat and operably connected to the blade holder for controlling releasable engagement between the blade holder and the swivel seat.

15 Claims, 6 Drawing Sheets

LOCKING MECHANISM FOR INCLINATION ADJUSTMENT OF A BLADE OF A CUTTING DEVICE

BACKGROUND OF THE INVENTION

1. Field of the Invention

The present invention relates to a locking mechanism for inclination adjustment of a blade of a cutting device.

2. Description of the Related Art

A typical cutting device comprises a base and a blade holder. When adjustment in an inclination of the cutting plane of the blade relative to a horizontal plane is required, an adjusting member located on a rear side of the base is operated to provide a gap between the blade holder and the base, thereby allowing adjustment in the inclination angle (or tilt angle) of the blade holder. Nevertheless, during such an adjustment, the operator's hand is close to and thus might be injured by the blade.

SUMMARY OF THE INVENTION

It is, therefore, an object of the present invention to provide a locking mechanism for inclination adjustment of a blade of a cutting device, wherein the inclination (or tilt angle) of the blade (i.e., the angle between the cutting plane and a horizontal plane) can be adjusted by operating an operative end of the locking mechanism that is located in front of the base, thereby eliminating potential injury to the operator. In particular, the locking mechanism comprises an operative rod for controlling engagement between the swivel seat and the blade holder. Thus, the blade holder together with the blade can be pivoted to a desired inclination when the swivel seat and the blade holder are disengaged from each other. The operative end for moving the operative rod is located in front of the swivel seat, thereby avoiding potential injury to the operator.

In accordance with a first aspect of the invention, a cutting device comprises a base having a first end and a second end opposite to the first end. A blade holder is releasably engaged with the second end of the base and rotatably holds a blade. The blade holder is pivotable relative to the base for cutting when the blade holder is engaged with the second end of the base. An inclination of the blade relative to the base is adjustable when the blade holder is disengaged from the second end of the base. An operative rod is mounted to the first end of the base and operably connected to the blade holder for controlling releasable engagement between the blade holder and the base.

In accordance with a second aspect of the invention, a cutting device comprises a base, a swivel seat rotatably mounted on the base and having a first end and a second end, and a blade holder releasably engaged with the second end of the swivel seat. A blade is rotatably held by the blade holder. The blade holder is pivotable relative to the swivel seat for cutting when the blade holder is engaged with the second end of the swivel seat. An inclination of the blade relative to the swivel seat is adjustable when the blade holder is disengaged from the second end of the swivel seat. An operative rod is mounted to the first end of the swivel seat and operably connected to the blade holder for controlling releasable engagement between the blade holder and the swivel seat.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
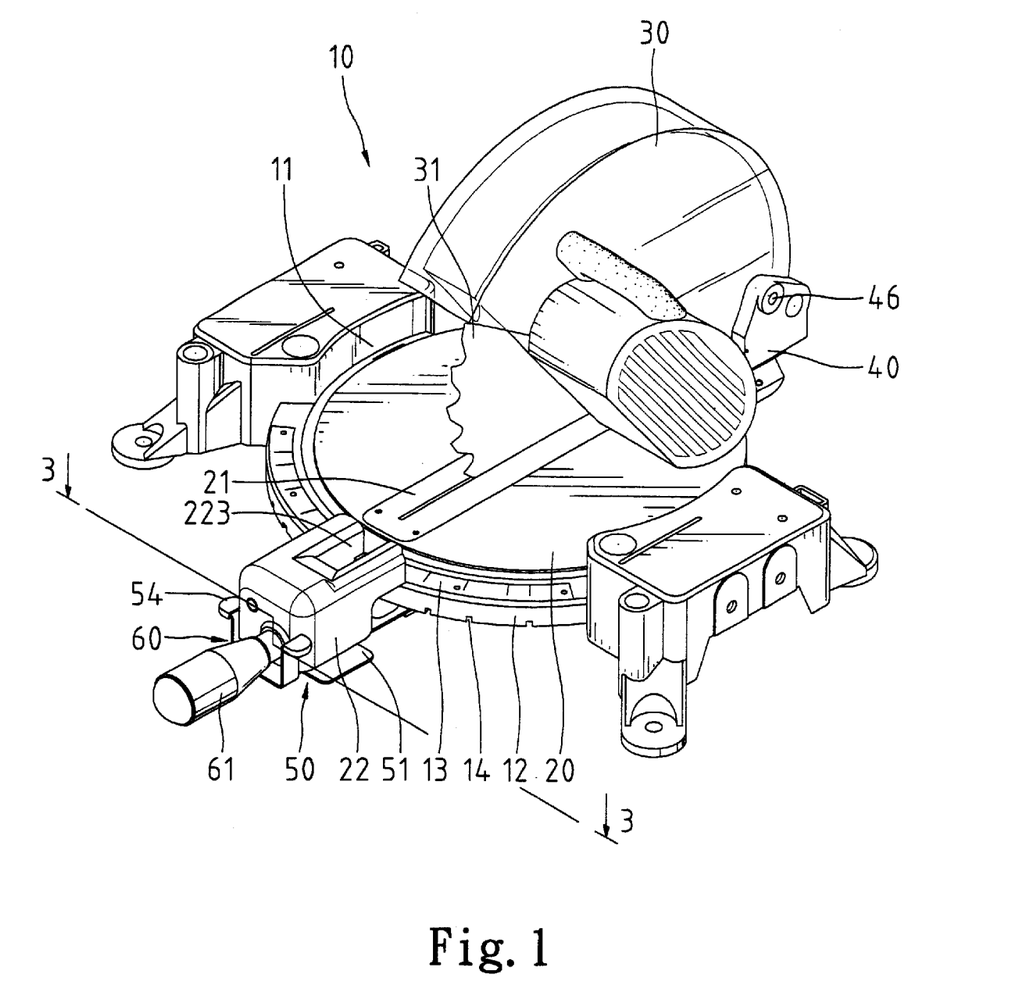
FIG. 1 is a perspective view of a cutting device in accordance with the present invention.
Figure 2:
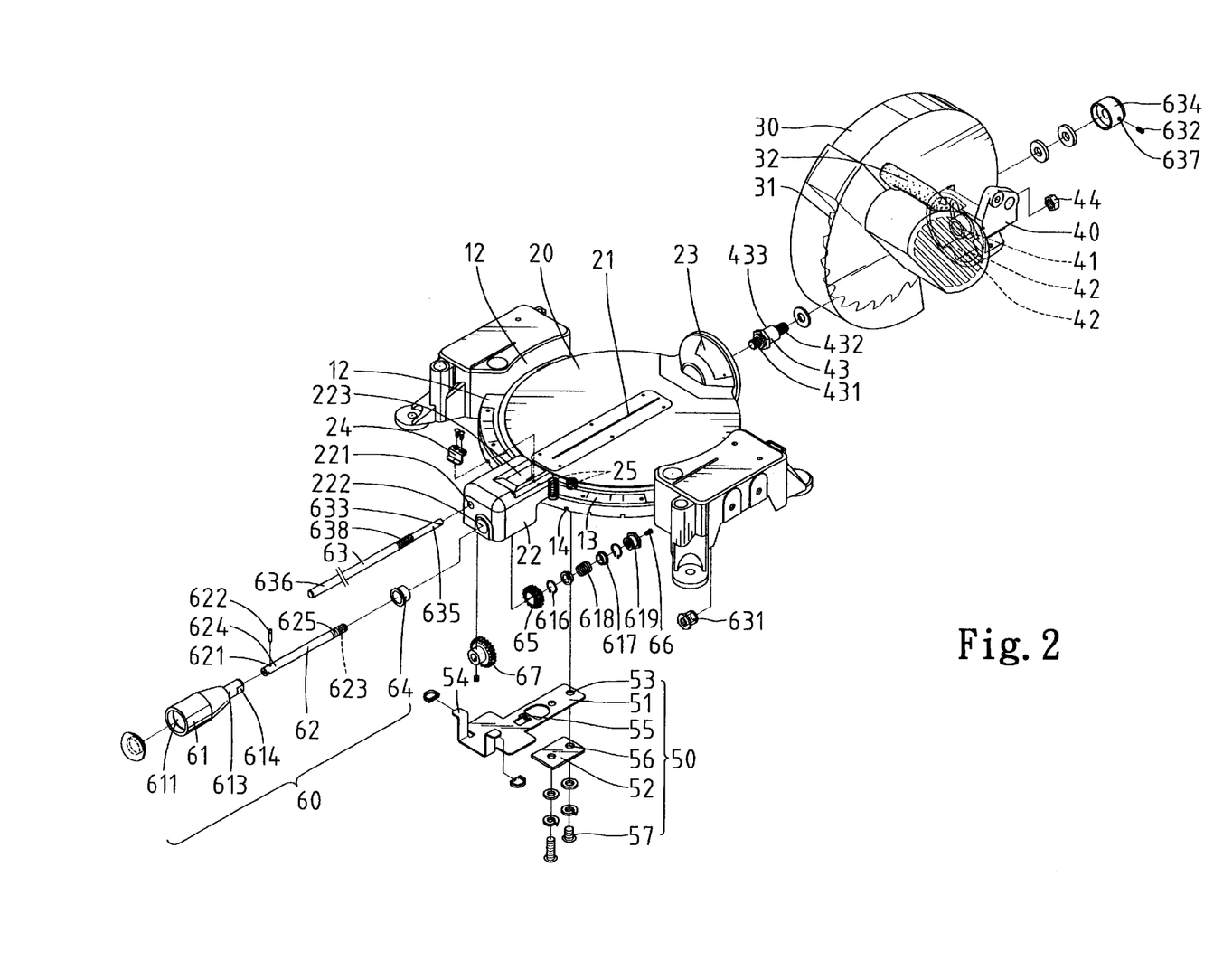
FIG. 2 is an exploded perspective view of the cutting device in accordance with the present invention.
Figure 3:
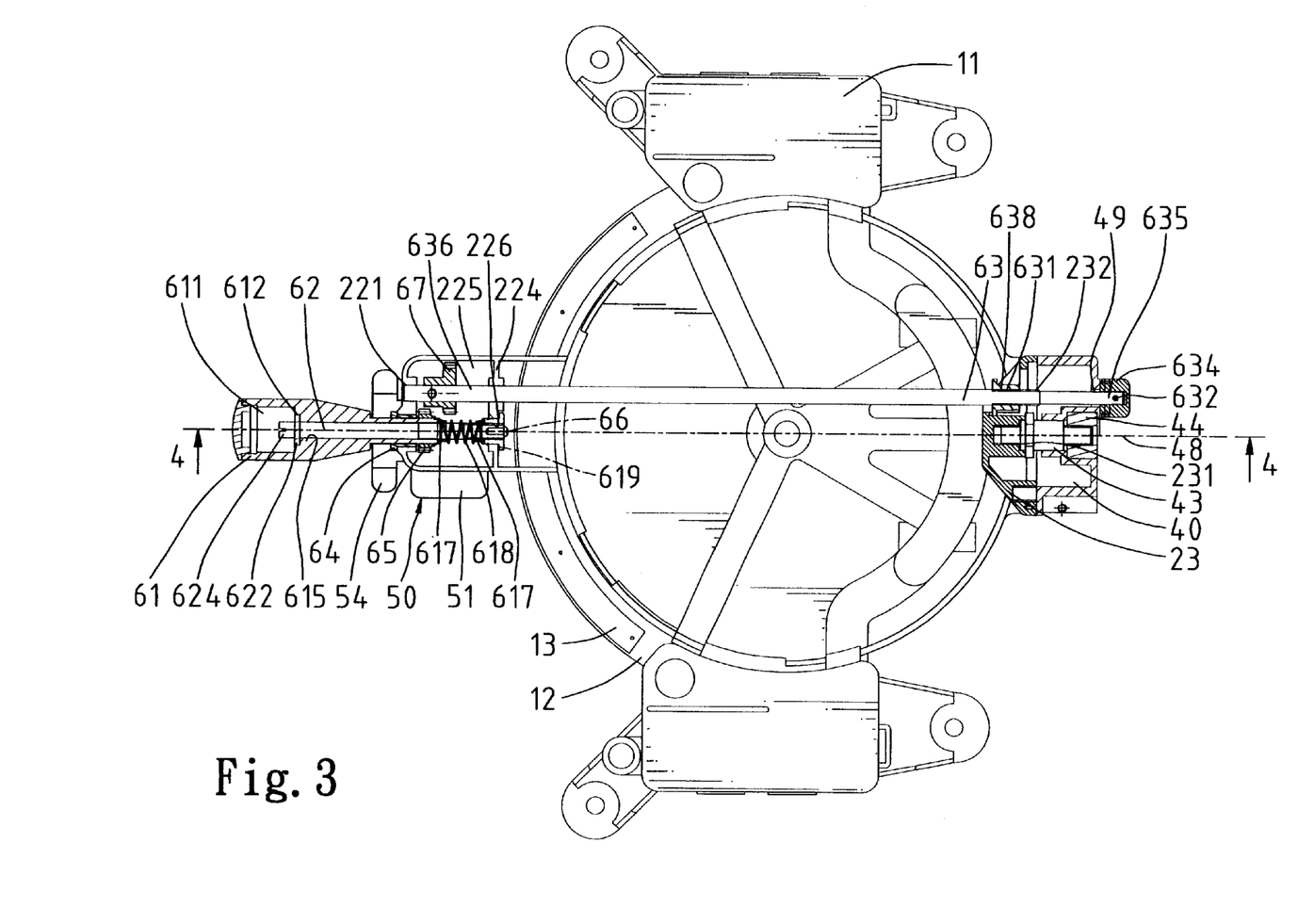
FIG. 3 is a sectional view taken along plane 3—3 in FIG. 1.

Referring to FIGS. 1 through 3, a cutting device 10 in accordance with the present invention generally includes a swivel seat 20 mounted on a base 11 and rotatable relative to the base 11 about a vertical axis orthogonal in the base 11. A blade holder 30 is pivotally mounted via a locking member 40 to a rear end of the swivel seat 20 for proceeding with a cutting function by a blade 31 rotably held by the blade holder 30, which will be described in detail later. The base 11 comprises an arc 12 on which a scale 13 is provided. Plural positioning notches 14 spaced by regular intervals are defined in an underside of the arc 12.

The swivel seat 20 comprises a cutting groove 21 (FIG. 2) through which the blade 31 is movable for cutting purpose. The rear end of the swivel seat 20 provides an engaging section 23 comprising a screw hole 231 and a hole 232. Formed on the front end of the swivel seat 20 is a mounting section 22. The mounting section 22 comprises a first longitudinal hole 221 and a second longitudinal hole 222 that extend along a direction parallel to a cutting plane of the blade 31. The mounting section 22 further comprises a window 223 having a pointer 24 received therein for reading the scale 13. The mounting section 22 further comprises a wall 224 delimiting a compartment 225 in the mounting section 22.

The locking member 40 is releasably engaged with the engaging section 23 of the swivel seat 20. The blade holder 30 is engaged with the locking member 40 and pivotable about a pivotal axis 46 (FIG. 1) for cutting by means of operating a handle 32 on the blade holder 30. It is noted that the locking member 40 is movable between a locking position and an unlocking position. In the locking position, the locking member 40 presses against the engaging section 23 of the swivel sear 20 and is thus fixed in place. The locking member 40 and the blade holder 30 cannot rotate about an engaging member 43 defining a pivotal axis 48 (FIG. 3) of the locking member 40 parallel to the first longitudinal hole 221 of the swivel seat 20; namely, adjustment of the inclination of the blade 31 is not allowed. But the blade holder 30 can be pivoted relative to the locking member 40 about the axis 46. In the unlocking position, the locking member 40 is disengaged from the engaging section 23 of the swivel seat 20 and thus rotatable, thereby allowing adjustment in the inclination of the blade 31 by means of turning the locking member 40 and the blade holder 30 about the pivotal axis 48 of the locking member 40.

A hole 41 is defined in a side of the locking member 40 that faces the engaging section 23 of the swivel seat 20. The engaging member 43 comprises a first threaded end 431 threadedly engaged in the screw hole 231 of the engaging section 23 of the swivel seat 20, a second threaded end 432, and an intermediate section 433 slidably and rotatably received in the hole 41 of the locking member 40. A nut 44 is engaged on the second threaded end 432 to prevent disengagement of the locking member 40. Thus, the locking member 40 is slidable and rotatable relative to the engaging section 23 of the swivel seat 20 in the unlocking position, which will be further described later.

A positioning device 50 is provided to position the swivel seat 20. The positioning device 50 comprises a resilient positioning plate 51 and a reinforcing plate 52. The positioning plate 51 comprises two holes 53 in a first end thereof, two wings 54 extending upright from a second end thereof, and a protrusion 55 on an intermediate portion thereof. Two bolts 57 are respectively extended through two holes 56 in the reinforcing plate 52 and the holes 53 in the positioning plate 51 and then threadedly engaged in two screw holes 25 in an underside of the swivel seat 20. The positioning plate 51 is thus positioned below the mounting section 22 of the swivel seat 20 with the protrusion 55 engaging with one of the positioning notches 14 of the base 11 for preventing rotational movement of the swivel seat 20 relative to the base 11.

A locking mechanism 60 is used to control engagement between the locking member 40 and the engaging section 23 of the swivel seat 20. In this embodiment, the locking mechanism 60 comprises an operative member 61, an actuating rod 62, and an operative rod 63. The operative rod 63 comprises a first end 636 received in the first longitudinal hole 221 of the mounting section 22 and a second end 635 extending beyond the locking member 40 after passing through the hole 232 in the engaging section 23 of the swivel seat 20 and a hole 49 in the locking member 40. A nut 631 is securely mounted in the engaging section 23 of the swivel seat 20 and threadedly engaged with a threaded section 638 of the operative rod 63. Thus, the operative rod 63 moves along a longitudinal axis thereof when it is turned.

A pressing cap 634 is mounted to the second end 635 of the operative rod 63, and a pin 632 is extended through a transverse hole 637 in the pressing cap 634 and a transverse pinhole 633 in the second end 635 of the operative rod 63. By such an arrangement, the pressing cap 634 and the operative rod 63 move longitudinally away from the locking member 40 when the operative rod 63 is turned in a direction, e.g., clockwise, such that the locking member 40 is no longer pressed against by the pressing cap 634. As a result, the locking member 40 is no longer in frictional contact with the engaging section 23 of the swivel seat 20. Pivotal movement of the locking member 40 is limited between two spaced blocks 42 on an inner periphery of the locking member 40.

To the contrary, when the operative rod 63 is turned in an opposite direction, e.g., counterclockwise, the locking member 40 will be moved toward the engaging section 23 by the pressing cap 634 and finally presses against the engaging section 23 for preventing rotation of the locking member 40. Namely, the locking member 40 is in frictional contact with the engaging section 23 of the swivel seat 20 when in the locking position. Thus, the locking member 40 can be disengaged from or engaged with the engaging section 23 of the swivel seat 20 by means of turning the operative rod 63. When the locking member 40 is in the unlocking position, the operator may grasp the handle 32 on the blade holder 30 and pivot the blade holder 30 and the locking member 40 about the pivotal axis 48 of the locking member 40 to the desired inclination. The sliding and rotating contact between the intermediate portion 433 of the engaging member 43 and the locking member 40 allows such adjustment. After adjustment in the inclination (or tilt angle) of the blade 31, the operative rod 63 is turned in the opposite direction. The operative rod 63 can be turned by means of operating the operative member 61.

As illustrated in FIG. 3, the operative member 61 comprises a compartment 611 in an end thereof, a wall defining the compartment 611 including a positioning groove 612. The other end 613 of the operative member 61 extends into the compartment 225 of the mounting section 22 of the swivel seat 20. It is noted that a hole 615 is defined in the other end 613 of the operative member 61 and has a first end communicated with the positioning groove 612 of the operative member 61 and a second end communicated with the compartment 225 of the mounting section 22 of the swivel seat 20. The other end 613 of the operative member 61 extends through a lining member or sleeve 64 located in the second longitudinal hole 222 of the mounting section 22 of the swivel seat 20. A drive gear 65 is mounted on the other end 613 of the operative member 61 by means of force-fitting engagement with two chamfered faces 614 of the outer end 613 of the operative member 61, and a C-clip 616 is provided to securely retain the drive gear 65 on the other end 613 of the operative member 61.

The actuating rod 62 extends through the hole 615 of the operative member 61 and comprises a first end 624 in the compartment 611 of the operative member 61 and a threaded second end 625 threadedly engaged with an inner threading (not labeled) of the sleeve 619, which, in turn, is securely located in a hole 226 in the wall 224 of the swivel seat 20 by a C-clip (not labeled). A positioning pin 622 is extended through a transverse pinhole 621 in the first end 624 of the actuating rod 62 and releasably engaged in the positioning groove 612 of the operative member 61. A pressing member 66 is partially engaged in a screw hole 623 defined in an end face of the second end 625 of the actuating rod 62. A spring 618 is mounted around the actuating rod 62 and attached between two sleeves 617 that are mounted around the actuating rod 62. It is noted that the drive gear 65 on the actuating rod 62 is disengaged from a driven gear 67 securely mounted on the operative rod 63 when adjustment in the inclination is not required.

Figure 4:
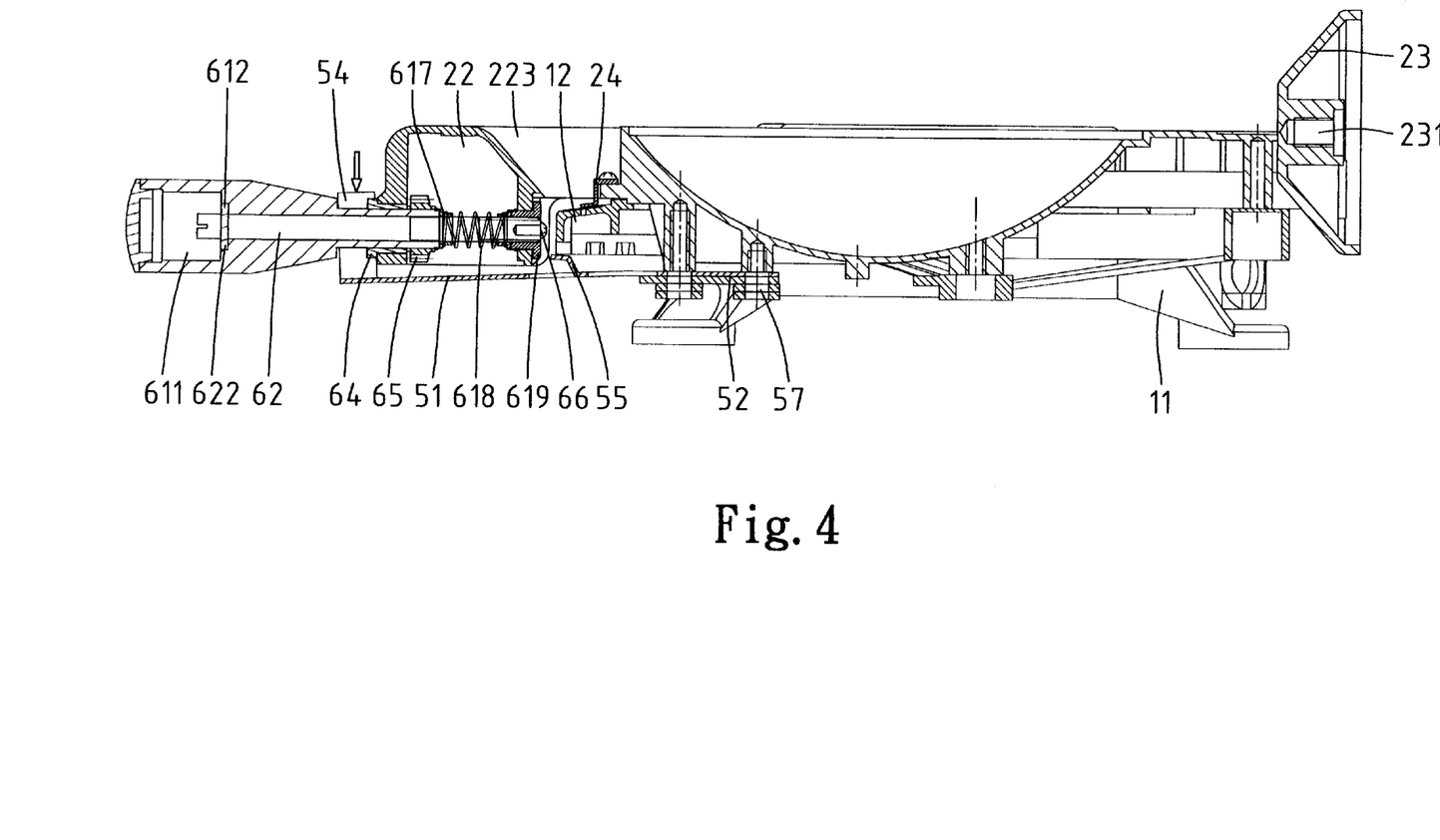
FIG. 4 is a sectional view taken along plane 4—4 in FIG. 3.

Referring to FIG. 3, when adjusting angular position of the swivel seat 20, the operative member 61 is turned in a direction, which, in turn, causes rotation of the actuating rod 62 in the same direction, as the positioning pin 622 of the actuating rod 62 is positioned in the positioning groove 612 of the operative member 61. The pressing member 66 on the actuating rod 62 that initially presses against an outer peripheral wall of the arc 12 of the base 11 is now disengaged from the peripheral wall of the arc 12. Referring to FIG. 4, the operator then pushes the wings 54 downward to disengage the protrusion 55 of the positioning plate 51 from the positioning notch 14 of the base 11. At this time, the swivel seat 20 is rotatable relative to the base 11 for adjustment in the angular position of the swivel seat 20 relative to the base 11. After adjustment, the wings 54 of the positioning plate 51 are released, the protrusion 55 of the positioning plate 51 returns to its initial position under the action of resiliency of the positioning plate 51 and thus engages with an associated one of the positioning notches 14 of the base 11. Then, the operative member 61 is turned in an opposite direction, which, in turn, causes rotation of the actuating rod 62 until the pressing member 66 presses against the outer peripheral wall of the arc 12 of the base 11, thereby assisting in positioning between the swivel seat 20 and the base 11. The angular position of the swivel seat 20 is indicated by the pointer 24 and the scale 13, which can be read via the window 223.

Figure 5:
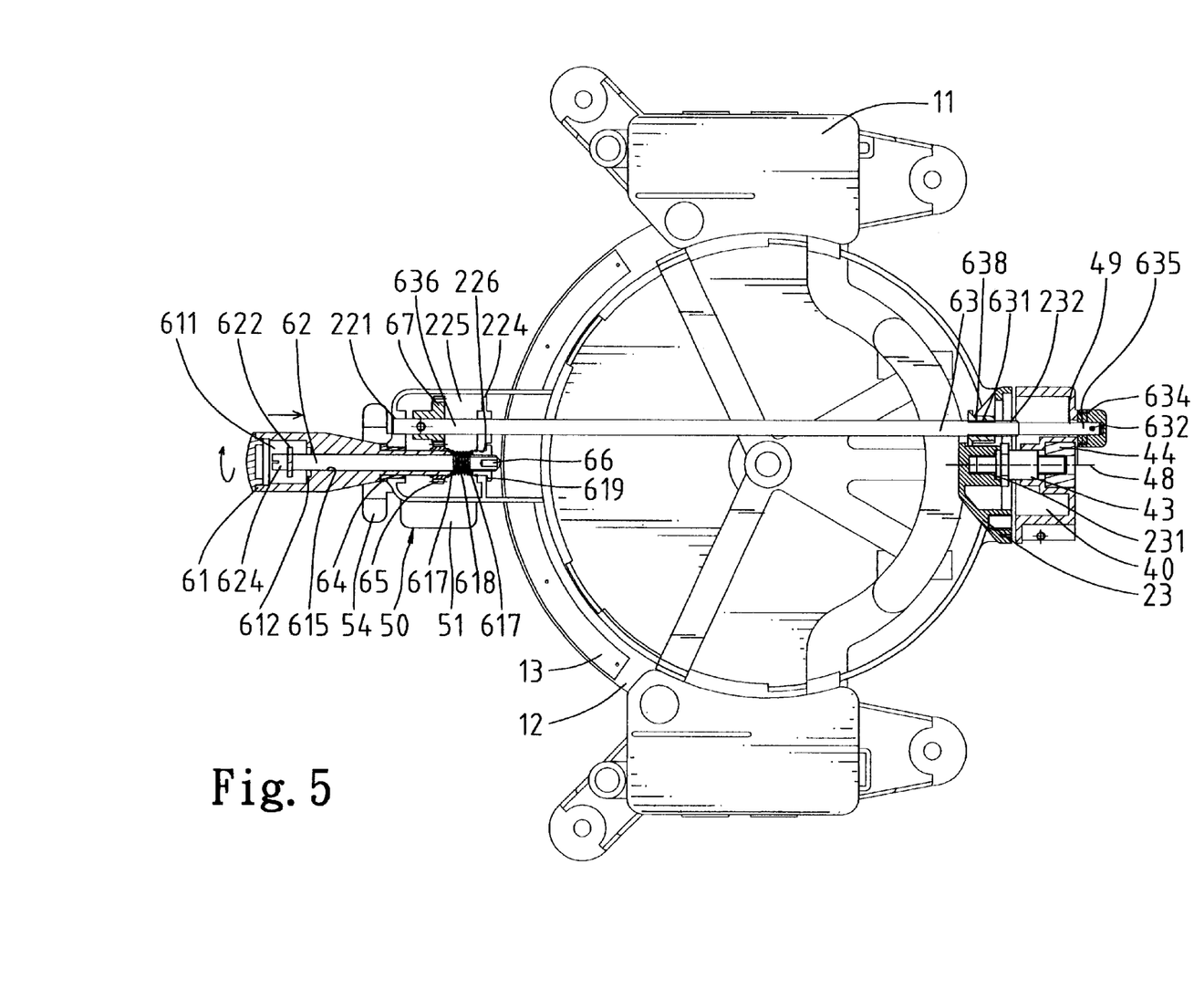
FIG. 5 is a view similar to FIG. 3, illustrating inclination adjustment of a cutting plane of the cutting device.

Referring to FIG. 5, when adjusting the inclination of the blade 31, the operative member 61 is pushed inward until the drive gear 65 meshes with the driven gear 67. The positioning pin 622 of the actuating rod 62 is no longer positioned in the positioning groove 612 of the operative member 61. Next, the operative member 61 is turned to drive the operative rod 63 in a direction, e.g., clockwise. The locking member 40 is no longer pressed against the engaging section 23 of the swivel seat 20 to thereby allow adjustment in inclination of the blade 31 by means of moving the handle 32 of the blade holder 30, as mentioned above. Next, the operative member 61 is turned in on opposite direction to turn the operative rod 63 counterclockwise, thereby urging the pressing cap 634 to press the locking member 40 against the engaging section 23 of the swivel seat 20, as mentioned above. After adjustment, the operative rod 63 is returned to its initial position under the action of the spring 618. The operative rod 63 will not be turned even if the operative member 61 is rotated, as the drive gear 65 disengages from the driven gear 67.

Figure 6:
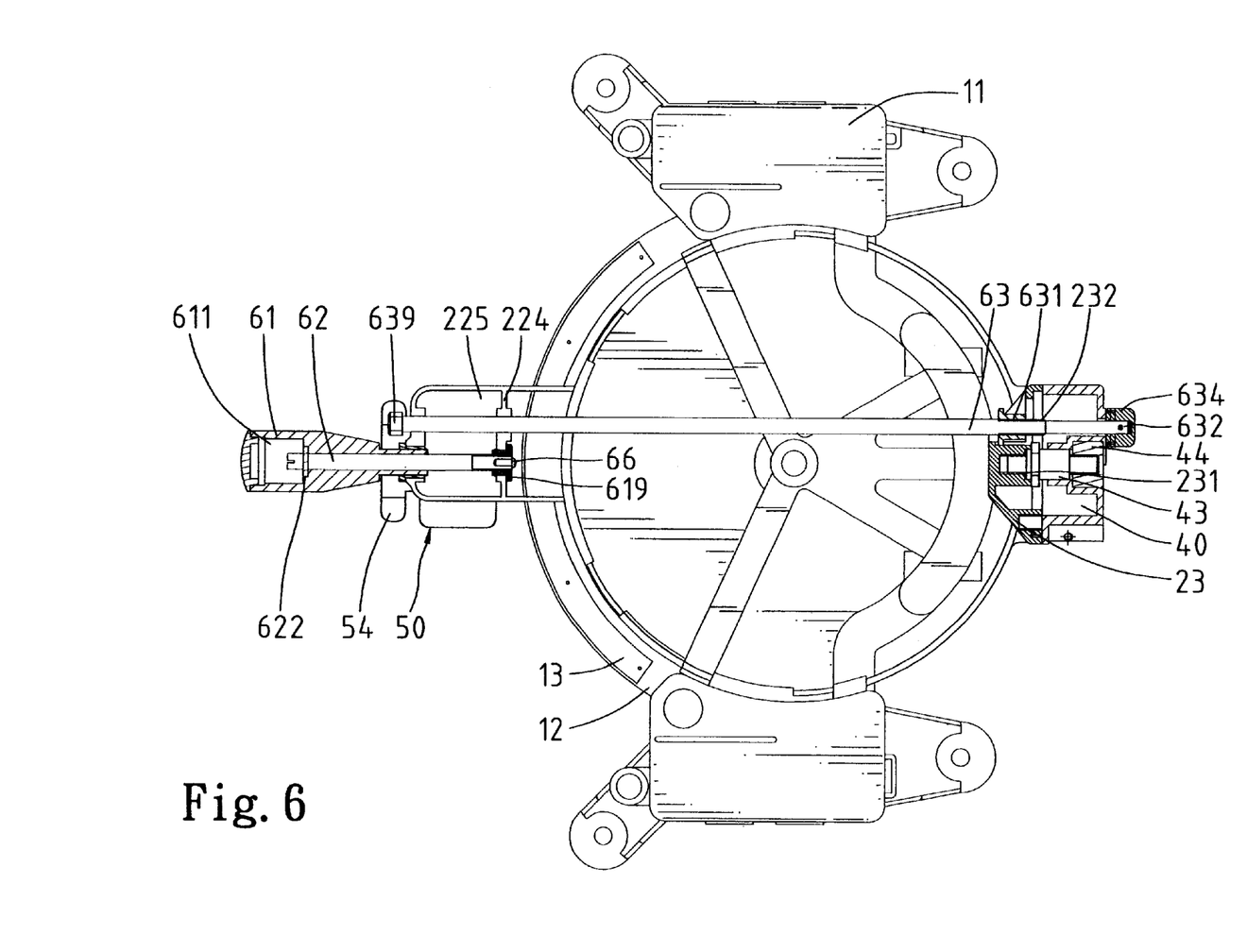
FIG. 6 is a sectional view similar to FIG. 3, illustrating a modified embodiment of the cutting device in accordance with the present invention.

FIG. 6 illustrates a modified embodiment of the invention, wherein the return spring 618 and corresponding elements are omitted. In addition, the drive gear 65 and the driven gear 67 are also omitted. Namely, the operative rod 63 and the operative member 61 are independent from each other. Further, a turning member 639 (e.g., a nut) is mounted on the exposed first end of the operative rod 63 that is distal to the locking member 40 and the engaging section 23 of the swivel seat 20. The turning member 639 allows rotational operation of the operative rod 63 for controlling engagement between the locking member 40 and the engaging section 23 of the swivel seat 20.

According to the above description, it is appreciated that adjustment in the inclination of the blade 31 and the angular position of the swivel seat 20 can be achieved easily without the risk of injury to the operator, as the operative end for the operative member 61 and the operative end for the operative rod 63 are distal to the locking member 40 and the engaging section 23 of the swivel seat 20.

When adjustment in the angular position of the swivel seat 20 is not required, the swivel seat 20 may be integral with the base 11. At this time, the locking member 40 and the blade holder 30 are directly associated with the base 11.

Although the invention has been explained in relation to its preferred embodiment, it is to be understood that many other possible modifications and variations can be made without departing from the scope of the invention as hereinafter claimed.

What is claimed is:

1. A cutting device comprising:
   a base;
   a swivel seat rotatably mounted on the base and having a first end and a second end;
   a blade holder releasably engaged with the second end of the swivel seat, with the blade holder adapted to rotatably hold a blade, with the blade holder being pivotable about a first axis relative to the swivel seat for cutting when the blade holder is engaged with the second end of the swivel seat, with the blade holder being pivotable about a second axis relative to the swivel seat for adjusting an inclination of the blade holder relative to the swivel seat, with the first axis being perpendicular to the second axis;
   an operative rod rotatably mounted to the first end of the swivel seat, the operative rod being operably connected to the blade holder for controlling releasable engagement between the blade holder and the swivel seat by the rotation of the operative rod to allow adjustment of the inclination of the blade holder; and
   means for controlling releasable engagement between the swivel seat and the base, wherein said means for controlling releasable engagement between the swivel seat and the base comprises a resilient positioning plate including a first end secured to the swivel seat and a second end for manual operation, the resilient positioning plate further comprising a protrusion, the base comprising a plurality of positioning notches, the protrusion of the resilient positioning plate being releasably engaged with one of the positioning notches of the base.

2. The cutting device as claimed in claim 1, further comprising an actuating rod mounted to the first end of the swivel seat, the actuating rod comprising a first end outside the first end of the swivel seat for operation and a second end, the actuating rod and the first end of the swivel seat being so arranged that the actuating rod moves along a longitudinal direction thereof between a locking position and an unlocking position, the second end of the actuating rod pressing against the base to thereby prevent relative rotation between the base and the swivel seat when the actuating rod is in the locking position, the second end of the actuating rod being disengaged from the base when the actuating rod is in the unlocking position.

3. The cutting device as claimed in claim 2, wherein the actuating rod comprises a threaded section, the swivel seat comprising a nut securely mounted therein, the nut being threadedly engaged with the threaded section of the actuating rod.

4. The cutting device as claimed in claim 2, further comprising an operative member mounted to the first end of the actuating rod and slidable along the actuating rod between an engaging position and a disengaging position, the operative member comprising a drive gear securely mounted thereon to rotate therewith, the operative rod comprising a driven gear securely mounted thereon to rotate therewith, the drive gear meshing with the driven gear when the operative member is in the engaging position, the drive gear being disengaged from the driven gear when the operative member is in the disengaging position.

5. The cuffing device as claimed in claim 4, wherein the operative member comprises a compartment in a first end thereof, a wall defining the compartment including a positioning groove, the operative member further comprising a hole in a second end thereof, the hole being communicated with the positioning groove, a positioning pin being securely mounted to the first end of the actuating rod, the actuating rod extending through the hole of the operative member with the first end of the actuating rod located in the compartment, the positioning pin being positioned in the positioning groove of the operative member when the operative member is in the disengaging position, the positioning pin being disengaged from the positioning groove of the operative member when the operative member is in the engaging position.

6. The cutting device as claimed in claim 5, wherein the actuating rod is moved between the locking position and the unlocking position when the operative member is in the disengaging position and when the first end of the operative member is turned.

7. The cutting device as claimed in claim 5, wherein the actuating rod comprises a threaded section, the swivel seat comprising a wall having a hole, a nut being securely mounted in the hole of the wall of the swivel seat, the nut being threadedly engaged with the threaded section of the actuating rod.

8. The cutting device as claimed in claim 7, further comprising means for returning the operative member from the engaging position to the disengaging position.

9. The cutting device as claimed in claim 8, wherein said returning means comprises an elastic element attached between the nut and the second end of the operative member.

10. A cutting device comprising:

a base;

a swivel seat rotatably mounted on the base and having a first end and a second end;

a blade holder releasably engaged with the second end of the swivel seat, with the blade bolder adapted to rotatably hold a blade, with the blade holder being pivotable about a first axis relative to the swivel seat for cutting when the blade holder is engaged with the second end of the swivel seat, with the blade holder being pivotable about a second axis relative to the swivel seat for adjusting an inclination of the blade holder relative to the swivel seat, with the first axis being perpendicular to the second axis; and an operative rod rotatably mounted to the first end of the swivel seat, the operative rod being operably connected to the blade holder for controlling releasable engagement between the blade holder and the swivel seat by the rotation of the operative rod to allow adjustment of the inclination of the blade holder, with the blade holder being pivotably mounted to the swivel seat by a locking member, wherein the operative rod extends from the first end of the swivel seat through the second end of the swivel seat and through the locking member, the operative rod comprising a first end and a second end that is outside the second end of the swivel seat, a pressing member being securely mounted to the second end of the operative rod to move therewith;

the operative rod and the swivel seat being so arranged that rotation of the operative rod causes longitudinal movement of the operative rod and the pressing member along a longitudinal axis of the operative rod;

wherein the pressing member is moved to a first position pressing the locking member against the second end of the swivel seat when the operative rod is turned in a first direction, thereby preventing adjustment in the inclination angle of the blade; and wherein the pressing member is moved to a second position not pressing the locking member against the second end of the swivel seat when the operative rod is turned in a second direction opposite to the first direction, thereby allowing rotational movement of the locking member and the blade holder relative to the swivel seat for proceeding with adjustment in the inclination angle of the blade.

11. The cutting device as claimed in claim 10, wherein the first end of the operative rod is outside the first end of the swivel seat, with the cutting device further comprising a turning member mounted to the first end of the operative rod for turning the operative rod.

12. The cutting device as claimed in claim 10, wherein the operative rod comprises a threaded section, the swivel seat comprising a nut securely mounted therein, the nut being threadedly engaged with the threaded section of the operative rod.

13. The cutting device as claimed in claim 10, further comprising an engaging member having a first end securely mounted to the second end of the swivel seat, an intermediate section, and a second end, the locking member being rotatably mounted around the intermediate section of the engaging member and slidable along a longitudinal direction of the engaging member when the pressing member is in the second position.

14. The cutting device as claimed in claim 13, wherein the second end of the swivel seat comprises a screw hole and the first end of the engaging member comprises an outer threading for engaging with the screw hole.

15. The cutting device as claimed in claim 13, wherein the second end of the engaging member comprises an outer threading, with the cutting device further comprising a nut engaged with the outer threading of the second end of the engaging member for preventing disengagement of the locking member from the engaging member.

* * * * *